Patented Nov. 7, 1922.

1,434,980

UNITED STATES PATENT OFFICE.

FREDERICK WILLIAM ATACK, OF MANCHESTER, ENGLAND, ASSIGNOR TO THE BRITISH ALIZARINE COMPANY LIMITED, OF MANCHESTER, LANCASTER, ENGLAND.

MANUFACTURE OF COMPOUNDS OF THE ANTHRAQUINONE SERIES.

No Drawing. Application filed March 18, 1921. Serial No. 453,358.

*To all whom it may concern:*

Be it known that I, FREDERICK WILLIAM ATACK, residing at Trafford Park, Manchester, in the county of Lancaster, England, have invented certain new and useful Improvements in the Manufacture of Compounds of the Anthraquinone Series, of which the following is a specification.

This invention relates to the manufacture of compounds of the anthraquinone series containing a $\beta$-halogen substituent.

In German Patent #275,299 it is stated that $\alpha$-brom-aminoanthraquinones are converted into $\beta$ derivatives in cases where a $\beta$ position is vacant in the ortho position with respect to the amino group. The reaction was stated to occur on heating dry or in presence of a suitable medium such as sulphuric acid, phosphoric acid or zinc chloride.

I have discovered that it is possible to effect a change of orientation in the case of other anthraquinone derivatives, more particularly chlorinated anthraquinones or their derivatives of various kinds and certain brominated anthraquinones or their derivatives.

The process according to my invention consists in the use of a specific reagent, viz., concentrated sulphuric acid at a high temperature, e. g., in the neighbourhood of 200° C. or for a longer time at a lower temperature. The $\alpha$-halogen derivatives are heated with such acid whereupon $\beta$-halogen derivatives are formed. "Concentrated sulphuric acid" is used to include oleum also, which can be employed when simultaneous isomerization and sulphonation or oxidation is desired.

The invention also includes cases in which the actual chlorination of the anthraquinone is performed in presence of the hot sulphuric acid so that the $\alpha$-halogen derivative is not isolated even if it is formed. If it is necessary to add a chlorine carrier such as iodine, suitable precautions must be taken to ensure that a sufficient amount of the carrier is present in spite of the high temperature used.

This reaction is not a mere extension of the process described in the German patent because I find that in the case of chlor compounds for example, as to which nothing is described in the German patent the reaction is specific to sulphuric acid and it does not appear to proceed in presence of phosphoric acid or zinc chloride or by heating the product alone. All these methods are given as alternatives in the German patent which treats only of the bromo-compounds. I further find that the reaction does not proceed in boiling nitrobenzene solution. The proposals of the German patent were confined to $\alpha$-brom derivatives of aminoanthraquinones, as indicated above and no extension of the reaction was suggested. Moreover, the German patent definitely states that there must be an unoccupied position which is ortho with respect to the amino group. Such a definition clearly excludes the possibility of applying the reaction to bodies which do not contain an amino group, and it also excludes cases in which the amino group is in a different nucleus to the halogen group.

I have discovered the conditions in which it is possible to extend the reaction. These are (*a*) the use of the specific reagent, sulphuric acid, and (*b*) the treatment of chlor-bodies (whether containing an amino group or not) or brom-bodies not containing an amino group in the same nucleus as the bromine atom, provided that a $\beta$ position is vacant which is in the meta position to the halogen substituent, with certain exceptions enumerated below.

In all cases it appears that the halogen group is found finally in the meta position with respect to its original position and therefore the invention is only applicable to those $\alpha$-halogen compounds which contain the meta position free which meta position is also a $\beta$ position; the $\beta$ positions of the anthraquinone nucleus are those numbered 2, 3, 6 and 7.

As regards chlor-compounds, the reaction is applicable to chloranthraquinones whether containing other substituents or not, for instance sulpho groups or amino groups. I give a series of examples of the process, but in applying the reaction to any other body, experiment is necessary to determine whether the chlorine group is expelled. For instance, I exclude bodies which are decomposed by hot sulphuric acid such as for instance 1. hydroxy.4.chloranthraquinone in which the dihydroxy body is produced. Again 1. amino.4.chloroanthraquinone sulphonates but is excluded from the scope of the invention because the chlorine is removed.

It has been proposed to heat certain α-halogen derivatives of anthraquinone with sulphuric acid and boric acid at temperatures below 200°C. in such manner as to obtain hydroxy compounds and my invention does not apply to compounds of this type which are as mentioned converted into hydroxy bodies by the action of sulphuric acid.

As regards the bromine compounds, I have discovered by using the specific reagent, sulphuric acid, compounds containing β-halogen derivatives can be obtained from 1.bromanthraquinone or bromanthraquinones containing substituents other than amino groups, e. g., sulpho groups, into compounds containing β-halogen derivatives, or bromaminoanthraquinones in which the amino group is in a different nucleus from that containing the bromine atom. The German patent refers to certain α-bromaminoanthraquinones but does not suggest that the reaction is applicable to the other brom-compounds I have mentioned, and it excludes these bodies by definition.

The invention will be understood more clearly with reference to the following examples:

*Example 1.*

Conversion of 1.chloroanthraquinone into 2.chloroanthraquinone.

50 gr. of 1.chloroanthraquinone (M. P. 160° C.) were heated with 500 cc. of concentrated sulphuric acid (sp. gr. 1.84) at 200° to 205° C. for 9 hours. The mixture was poured into water and filtered. The product by recrystallization from acetic acid had M. P. 202° to 204° (which is identical with the melting point of 2.chloroanthraquinone prepared from anthraquinone. 2.sulphonic acid sodium salt.) On the reduction with zinc dust and ammonia, 2.chloroanthrancene of the correct melting point (217°) is obtained.

*Example 2.*

Conversion of 1.5.dichloroanthraquinone into 2.6.dichloroanthraquinone.

50 gr. of 1.5.dichloroanthraquinone were heated with 500 cc. of concentrated sulphuric acid (sp. gr. 1.84) at 200° to 220° for 7 hours. The mixture was poured into water and filtered. The product, after recrystallization from toluene had M. P. 280° to 282°, which is identical with that given in the literature for 2.6.dichloroanthraquinone. Reduction of this sample with zinc dust and ammonia gave a product of M. P. 252° C. and the same product was obtained from 2.6.dichloroanthraquinone prepared from anthraquinone.2.6.disulphonic sodium salt.

*Example 3.*

40 gr. of 1.bromanthraquinone (M. P. 184°) were heated with 250 cc. of concentrated sulphuric acid (sp. gr. 1.84) at 215° to 220° C. for 6 hours. The mixture was poured into water, filtered, and the precipitate washed with dilute caustic soda. The residue on recrystallizing from acetic acid proved to be 2.bromoanthraquinone of M. P. 201° C.

*Example 4.*

50 gr. of 1.6.dichloroanthraquinone were heated with 500 cc. of concentrated sulphuric acid (sp. gr. 1.84) at 215° to 220° C. for 4 hours. After isolating as usual, the product crystallized from acetic acid proved to be 2.7.dichloroanthraquinone of M. P. 224° C.

*Example 5.*

50 gr. of the sodium salt of 1.chloroanthraquinone.5.sulphonic acid were heated with 250 cc. concentrated sulphuric acid (sp. gr. 1.84) at 215° to 220° C. for 5 hours. After separating the sulphonic acid produced it was dissolved in water and the sulphonic acid group replaced by chlorine by means of hydrochloric acid and sodium chlorate and a dichloroanthraquinone of melting point 190° C. was produced. As the melting point of 1.5.dichloroanthraquinone is 251° C. it may be assumed that the α-chloro-compound had been completely or partly converted into the β-chloro.

*Example 6.*

50 gr. of 1.amino.5.chloroanthraquinone (M. P. 210° C.) were heated with 200 cc. concentrated sulphuric acid (sp. gr. 1.84) for 5 hours at 200° to 220° C. The product which was insoluble in dilute caustic soda was isolated in the usual manner and on recrystallizing from acetic acid had M. P. of 180° C.

The words halogen derivatives or chlor derivatives of anthraquinone include derivatives containing more than one halogen atom or containing other substituents such as amino or sulpho groups, unless these expressions are specifically limited.

I declare that what I claim is:

1. The process of treating α-halogen derivatives of anthraquinone containing at least one halogen substituent in a benzene nucleus unoccupied by an amino group and having an unsubstituted β position which is meta to the halogen, to convert them into β-halogen derivatives, which includes the step of heating such an α-halogen derivative to a high temperature in presence of concentrated sulphuric acid.

2. The process of treating α-halogen derivatives of anthraquinone containing more than one halogen substituent of which at least one is in an α position and having an unsubstituted β position which is meta to the halogen to convert such an α-halogen derivative into β halogen substituent in the α position derivatives, which includes the step of heating them to a high temperature in presence of concentrated sulphuric acid.

3. The process of treating a derivative of anthraquinone containing at least one chlorine atom in the α position and having an unsubstituted β position which is meta to the chlorine atom, to convert it into a β-chlor derivative, which includes the step of heating it to a high temperature in presence of concentrated sulphuric acid.

4. The process of treating a derivative of anthraquinone containing more than one chlorine atom of which at least one is in the α position and having an unsubstituted β position which is meta to the chlorine atom in the α position, to convert it into a β-chlor derivative, which includes the step of heating it to a high temperature in presence of concentrated sulphuric acid.

5. The process of treating a derivative of aminoanthraquinone containing at least one chlorine atom in the α position and having an unsubstituted β position which is meta to said chlorine atom, to convert it into a β-chlor derivative, which includes the step of heating it to a high temperature in presence of concentrated sulphuric acid.

6. The process of obtaining a β-chlor derivative of a dichloroanthraquinone having at least one of its chlorine atoms in an α position, and an unsubstituted β position meta to one of said chlorine atoms, in which one step of the process consists in heat treatment of such dichloroanthraquinone in presence of concentrated sulphuric acid at a high temperature.

7. The process of treating α-halogen derivatives of anthraquinone containing at least one halogen substituent in a benzene nucleus unoccupied by an amino group and having an unsubstituted β position which is meta to said halogen substituent to convert them into β-halogen derivatives, which includes the step of heating such an α-halogen derivative to about 200° C. in presence of concentrated sulphuric acid.

8. The process of treating a derivative of anthraquinone containing at least one chorine atom in the α position and having an unsubstituted β position which is meta to said chlorine atom, to convert it into a β-chlor derivative, which includes the step of heating it to about 200° C. in presence of concentrated sulphuric acid.

9. The process of obtaining β-halogen derivatives of a dihalogen anthraquinone containing at least one halogen atom in an α position and having an unsubstituted β position meta thereto, in which one step of the process consists in heat treatment in presence of sulphuric acid at a high temperature.

In witness whereof, I have hereunto signed my name this 2 day of March, 1921, in the presence of two subscribing witnesses.

FREDERICK WILLIAM ATACK.

Witnesses:
  HAROLD E. POTTS,
  JOHN McLACHLAN.